United States Patent [19]

Bokerman et al.

[11] 4,052,529
[45] Oct. 4, 1977

[54] RADIATION-CURABLE MERCAPTOALKYL VINYL POLYDIORGANOSILOXANES, METHOD OF COATING THERE WITH AND COATED ARTICLE

[75] Inventors: Gary N. Bokerman; Joseph A. Colquhoun, both of Midland; David J. Gordon, Essexville, all of Mich.

[73] Assignee: Dow Corning Corporation, Midland, Mich.

[21] Appl. No.: 663,324

[22] Filed: Mar. 3, 1976

[51] Int. Cl.$^2$ .............................................. B05D 3/06
[52] U.S. Cl. ............................ 428/537; 204/159.13; 260/46.5 E; 260/825; 260/827; 427/44; 427/54; 428/447
[58] Field of Search ............... 427/54, 44; 204/159.13, 204/159.15; 260/46.5 UA, 46.5 E, 825, 827; 428/447, 537

[56] References Cited

U.S. PATENT DOCUMENTS

| | | | |
|---|---|---|---|
| 3,328,482 | 6/1967 | Northrop et al. | 260/825 |
| 3,436,252 | 4/1969 | Neuroth | 260/827 |
| 3,532,729 | 10/1970 | Cekada et al. | 260/827 |
| 3,686,356 | 8/1972 | Saam | 260/825 |
| 3,726,710 | 4/1973 | Berger et al. | 427/12 |
| 3,770,687 | 11/1973 | Mestetsky | 260/827 |
| 3,816,282 | 6/1974 | Viventi | 260/46.5 UA |
| 3,873,499 | 3/1975 | Michael et al. | 260/46.5 UA |
| 3,923,923 | 12/1975 | Fiedler | 260/827 |

*Primary Examiner*—John H. Newsome
*Attorney, Agent, or Firm*—George A. Grindahl

[57] ABSTRACT

Certain polydiorganosiloxane compositions bearing mercaptoalkyl radicals and vinyl radicals are disclosed which cure in the presence of radiation such as ultraviolet light. The compositions consist essentially of a mixture of a triorganosiloxane-endblocked polydiorganosiloxane fluid in which from 1 to 5 percent of the organic radicals are mercaptoalkyl radicals and a methylvinylpolysiloxane. The compositions may be applied to a substrate such as paper and exposed to radiation to prepare a coated substrate that provides premium release of aggressive acrylic adhesives.

23 Claims, No Drawings

RADIATION-CURABLE MERCAPTOALKYL VINYL POLYDIORGANOSILOXANES, METHOD OF COATING THERE WITH AND COATED ARTICLE

BACKGROUND OF THE INVENTION

1. Field of the Invention

This invention relates to new polydiorganosiloxane compositions that are curable with radiation; to a method of preparing a coated substrate using said compositions and to the coated substrate produced thereby.

In particular, this invention relates to certain mercaptoalkyl- and vinyl-containing polydiorganosiloxane compositions which, when applied to a substrate such as paper and exposed to energetic radiation such as ultraviolet light, will cure rapidly to produce a coating, adhered to the substrate, that provides premium release of aggressive acrylic adhesives.

2. Description of the Prior Art

Polyorganosiloxanes have been used for a long time to coat solid substrates, such as paper, to improve the release of adhesive materials therefrom. As the adhesive properties and holding power of adhesive materials have improved, the need for improved release coatings has increased. Improved release coatings have also been required by other factors such as increasing environmental concerns, a desire for faster coating and curing processes, and a need to lower process energy costs.

Solventless, radiation-curable coatings have thus been sought that would provide premium release of aggresive acrylic adhesives. A coating is considered to provide premium release if a force of not more than 100 grams per inch (38.61 newtons per meter), as measured by the method hereinafter described, is needed to remove the adhesive from the coating. An aggressive adhesive is a material that requires a force of at least approximately 460 newtons/meter (N/m) to remove the adhesive from a stainless steel surface using said method of measuring.

Mercaptoalkyl- and vinyl-substituted silanes, siloxanes and polysiloxane compositions are not new; but only recently has the reaction of silicon-bonded mercaptoalkyl radicals with silicon-bonded vinyl radicals been used to convert a fluid polyorganosiloxane composition to a solid material having useful properties such as hardness and adhesive release.

Low-temperature, fast-curing electrical and coating resins consisting essentially of certain mercaptoalkyl-containing siloxane resins, a methylvinylpolysiloxane compatible with the resin and certain gelation inhibitors are disclosed and claimed by Michael, et al., in U.S. Pat. No. 3,873,499. The compositions of Michael, et al., are curable with ultraviolet light, electron radiation or free-radical generators. Without the gelation inhibitor the mixture of resin and polymethylvinylsiloxane will spontaneously cure at room temperature in a relatively short period of time.

Viventi, U.S. Pat. No. 3,816,282, discloses and claims an organopolysiloxane composition, curable at room temperature in the presence of electromagnetic and particulate radiation, comprising a high-molecular-weight organopolysiloxane wherein a small percentage, for example from 0.1 to 2 percent, of the siliconbonded organic radicals are vinyl; an organopolysiloxane fluid having mercaptoalkyl substituents and from 0.025 to 1 percent by weight of certain free-radical photosensitizers. The compositions of Viventi can be cured in a period of time as short as 5 to 10 minutes or as long as 2 to 4 hours. Even 5 minutes is an undesirably long cure time for many commercial applications, especially in the paper coatings industry. A curable composition with a cure time of less than 60 seconds, and preferably less than 5 seconds, is desired.

Gant, in U.S. application Ser. No. 401,791 filed Sept. 28, 1973, entitled "UV Curable Composition" and assigned to the assignee of this invention, discloses and claims a composition, curable on exposure to ultraviolet light, consisting essentially of a siloxane having silicon-bonded hydrogen atoms and/or a mercapto-functional-containing siloxane; a vinyl-containing siloxane and a photosensitizer. In the compositions of Gant the mercapto-functional-containing siloxane can be any siloxane consisting essentially of from 0.1 to 100 mole percent of units of the formula $(HSR'')_y(R''')_x SiO_{(4-x-y)/2}$, any other siloxane units having the formula $R''''_z SiO_{(4-z)/2}$, wherein $R''$ is an alkylene radical, $R'''$ and $R''''$ are monovalent hydrocarbon radicals and/or monovalent halogenated hydrocarbon radicals, $x$ is 0-2, $y$ is 1 or 2, $z$ is 0-3, and $x + y$ is 1-3. The vinyl-containing siloxane in the compositions of Gant consists essentially of from 0.1 to 100 mole percent of units of the formula $(CH_2=CH)R_n SiO_{(3-n)/2}$, any non-vinyl containing units having the formula $R'_m SiO_{(4-m)/2}$ wherein R and R' are monovalent hydrocarbon radicals and/or monovalent halogenated hydrocarbon radicals, $n$ is 0-2 and $m$ is 0-3. For every mercaptoalkyl radical there is from 0.01 to 100 vinyl radicals in the composition of Gant.

Gant, in U.S. application Ser. No. 401,792 filed Sept. 28, 1973, entitled "Improving Release Characteristics of Substrates" and assigned to the assignee of this invention, discloses and claims a method of treating a solid substrate to improve release of adhesive materials therefrom comprising applying the compositions of Gant that are disclosed in U.S. application Ser. No. 401,791 to said substrate and curing the applied composition by exposing it to ultraviolet light.

Certain compositions within these broad boundaries have been shown by Gant to be useful as a U.V.-curable paper coating for releasing adhesive materials. However, these compositons do not provide the premium release that is needed for aggressive acrylic adhesives, especially acrylic adhesives of the curing types.

SUMMARY OF THE INVENTION

It is an object of this invention to provide a polydiorganosiloxane composition which is curable on exposure to energetic radiation and which, in the cured form, has improved release of adhesive materials.

It is another object of this invention to provide a method of treating a substrate to provide premium release of aggressive acrylic adhesives therefrom.

It is a further object of this invention to provide an article comprising a solid substrate having adhered thereto a cured polyorganosiloxane coating which provides premium release of aggressive acrylic adhesives applied thereto.

These and other objects, which will be obvious to one skilled in the art after considering the following disclosure and appended claims are achieved by preparing the radiation-curable polydiorganosiloxane compositions of this invention consisting essentially of a mixture of a triorganosiloxane-endblocked polydiorganosiloxane having silicon-bonded mercaptoalkyl radicals and a methylvinylpolysiloxane, applying said radiation-curable composition to a solid substrate and exposing the applied composition to energetic radiation to provide the article of this invention comprising a substrate having a cured coating adhered thereto that will provide premium release of aggressive acrylic adhesives.

DESCRIPTION OF THE INVENTION

This invention relates to a radiationcurable polydiorganosiloxane composition consisting essentially of a mixture of (A) a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula —$(CH_2)_nSH$, wherein $n$ has a value of from 1 to 4 inclusive, any remaining organic radicals in (A) being alkyl radicals having from 2 to 6, inclusive, carbon atoms or phenyl, and (B) a methylvinylpolysiloxane compatible with (A) and having an average of at least three vinyl groups per molecule, the amount of (B) being sufficient to provide from 0.2 to 1.0 silicon-bonded vinyl radicals for every silicon-bonded mercaptoalkyl radical in the composition.

This invention also relates to a method of treating a solid substrate to improve the release of adhesive materials therefrom, said method comprising (I) applying to the substrate the radiation-curable polyorganosiloxane composition obtained by mixing components consisting essentially of (A) and (B) (II) exposing the applied mixture to energetic radiation and (III) recovering an article comprising the substrate having adhered thereto a cured polydiorganosiloxane that will provide premium release of aggressive acrylic adhesives therefrom.

Component (A) is any triorganosiloxane-endblocked polydiorganosiloxane of the formula $R_3SiO(R_2SiO)_q$-$SiR_3$ wherein the value of $q$ is such that the viscosity of the polydiorganosiloxane has a value of at least 500 centipoise (0.5 pascal-seconds) at 25° C. Each R radical may be, independently, an alkyl radical of from 1 to 6 carbon atoms, such as methyl, ethyl, isopropyl, butyl, pentyl, hexyl, and cyclohexyl; or a phenyl radical or a mercaptoalkyl radical. Suitable mercaptoalkyl radicals have the formula —$(CH_2)_nSH$, wherein n has a value of from 1 to 4, such as —$CH_2SH$, —$CH_2CH_2SH$, —$CH_2CH_2CH_2SH$ and —$CH_2CH_2CH_2CH_2SH$. Mercaptopropyl radicals are preferred because of synthesis, stability and odor considerations. From 50 to 99 percent of all R radicals are the methyl radical. It is preferred that each silicon atom in (A) have at least one silicon-bonded methyl radical. From 0 to 5 percent of all R radicals are the phenyl radical. Preferably the number of phenyl radicals is as small as possible, for example as endblocking radicals, since the cure rate of radiaion-cured compositions is retarded by the presence of phenyl radicals. From 1 to 5 percent of all R radicals are mercaptoalkyl radicals. Mercaptoalkyl radicals may be bonded to any of the silicon atoms in (A) but it is preferred that a majority of mercaptoalkyl radicals are non-terminal, i.e. are bonded to non-terminal silicon atoms.

Polydiorganosiloxanes that are preferred as component (A) therefore have two methyldiorganosiloxane endblocking units per molecule, such as $(CH_3)_3SiO_{1/2}$, $(CH_3)_2(HSCH_2CH_2CH_2)SiO_{1/2}$ and $C_6H_5(CH_3)_2SiO_{1/2}$, methylorganosiloxane units, such as $(CH_3)_2SiO$, $CH_3(C_6H_5)SiO$, and $CH_3(CH_3CH_2)SiO$ and methylmercaptoalkylsiloxane units, such as $CH_3(HSCH_2CH_2)SiO$ and $CH_3(HSCH_2CH_2CH_2)SiO$. A polydiorganosiloxane consisting of $(CH_3)_3SiO_{1/2}$ units, $(CH_3)_2SiO$ units and $CH_3(SHCH_2CH_2CH_2)SiO$ units is highly preferred. While polydiorganosiloxane (A) is described as consisting of triorganosiloxane units and diorganosiloxane units, it is to be understood that there can be in (A) small amounts of $RSiO_{3/2}$ units that are normally present as impurity units in commercial polydiorganosiloxanes.

The viscosity of component (A) should have a value of at least 0.5 pascal-seconds (Pa·s) at 25° C. so that the mixture of (A) and (B) will have a viscosity such that the mixture can be conveniently applied to a substrate and cured. There is no known upper limit for the value of the viscosity of (A); however, the viscosity of the mixture of (A) and (B) should be sufficiently low so that said mixture can be readily applied to the substrate. For general applications a practical upper limit for the viscosity of the mixture of (A) and (B) is approximately 100 Pa·s. For paper coating applications, a preferred upper limit for the viscosity of a mixture of (A) and (B) is approximately 10 Pa·s. If the viscosity of the mixture of (A) and (B) is undesirably high, any common volatile organic solvent, such as benzene, toluene, methylene chloride or cyclohexane can be admixed with the mixture to reduce the viscosity of the mixture of (A) and (B) to a value of no more than 100 Pa·s at 25° C., preferably no more than 10 Pa·s at 25° C. for paper coating applications. Preferably component (A) has a viscosity of from 0.5 to 100 Pa·s at 25° C. for general applications and a viscosity of from 0.5 to 10 Pa·s at 25° C. for paper coating applications.

Component (A) may be prepared by any suitable method that can be used for the preparation of triorganosiloxane-endblocked polydiorganosiloxane bearing mercaptoalkyl radicals. For example, in one method a silane bearing silicon-bonded hydrolyzable radicals and at least one mercaptoalkyl radical, such as $(HSCH_2CH_2CH_2)(CH_3)Si(OCH_3)_2$ is hydrolyzed and condensed to prepare a mixture of cyclic and silanol-endblocked polyorganomercaptoalkylsiloxanes which is then mixed with an appropriate amount of a suitable diorganocyclopolysiloxane such as dimethylcyclopolysiloxane, an appropriate amount of a suitable endblocking source such as triorganosiloxane-endblocked siloxane such as decamethyltetrasiloxane and hexamethyldisiloxane and an acid catalyst such as $CF_3SO_3H$ and heated for from 3 to 8 hours. Alternately, a mercaptoalkyl-containing cyclopolysiloxane such as {$(HSCH_2CH_2CH_2)(CH_3)SiO$}, may be used in place of the polyorganomercaptoalkylsiloxane mixture in the method recited above. Other methods for preparing component (A) will be obvious to one skilled in the silicone polymer art.

Component (B) is any methylvinylpolysiloxane which is compatible with component (A) and which has at least three silicon-bonded vinyl radicals per molecule. By the term methylvinylpolysiloxane it is meant that essentially all of the siloxane units of (B) are methylvinylsiloxane units. Of course, it should be understood that component (B) may have minor amounts of other siloxane units such as diorganosiloxane units such as $(CH_3)_2SiO$; triorganosiloxane endblocking units, such as $(CH_3)_3SiO_{1/2}$ and $(C_6H_5)(CH_3)(CH_2=CH)SiO_{1/2}$; organosiloxane units such as $CH_3SiO_{3/2}$ and $CH_2=CHSiO_{3/2}$ and hydroxysiloxane units such as hydroxydiorganosiloxane units such as $(HO)(CH_3)(CH_2=CH)SiO_{1/2}$ and $(HO)(CH_3)_2SiO_{1/2}$ without departing from the spirit of this invention as long as the presence of said other siloxane units in component (B) do not adversely effect the premium release of the cured composition of this invention. Component (B) may be cyclic, linear or branched as long as it is compatible with (A). For example, component (B) may be a methylvinylcyclopolysiloxane or a hydroxy-endblocked methylvinylpolysiloxane such as HO{CH$_3$(CH$_2$=CH)SiO}$_z$H or a triorganosiloxane-endblocked methylvinylpolysiloxane such as (CH$_3$)$_3$SiO{CH$_3$(CH$_2$=CH)SiO}$_z$Si(CH$_3$)$_3$ and (CH$_3$)$_3$SiO{CH$_3$(CH$_2$=CH)SiO}$_z$Si(CH$_3$)$_2$(CH=CH$_2$). Furthermore, component (B) may be a single methylvinylpolysiloxane or a mixture of methylvinylpolysiloxanes such as a mixture of linear and cyclic methylvinylpolysiloxanes. Component (B) is preferably a methylvinylcyclopolysiloxane having from 3 to 10 silicon atoms per molecule. Furthermore, the methylvinylcyclopolysiloxane may be a single methylvinylcyclopolysiloxane, such as a methylvinylcyclotetrasiloxane or it may be a mixture of two or more methylvinylcyclopolysiloxanes. Most preferably, component (B) has the formula {CH$_3$(CH$_2$=CH)SiO}$_z$, wherein z has a value of from 3 to 10 inclusive.

Methylvinylpolysiloxanes are well known in the organosilicon art. They can be prepared by any suitable method for the preparation of diorganopolysiloxanes. A convenient method is to hydrolyze methylvinyldichlorosilane and distill the volatile methylvinylcyclopolysiloxanes. The addition of suitable endblocking species such as trimethylchlorosilane to the hydrolysis mixture will result in endblocked linear poly(methylvinylsiloxanes) which may also be distilled.

The compositions of this invention are prepared by mixing the triorganosiloxane-endblocked polydiorganosiloxane (A) with an appropriate amount of the methylvinylpolysiloxane (B) in any suitable manner such as blending, stirring, milling and tumbling. Although not required, the use of solvents and/or heat to aid this mixing process is possible. Any solvents that are used in the mixing process may be removed before or after the compositions of this invention are applied to a substrate.

An appropriate amount of component (B) that is to be mixed with component (A) is an amount such that there are from 0.2 to 1.0 silicon-bonded vinyl radicals in (B) for every silicon-bonded mercaptoalkyl radical in component (A). Compositions in which the ratio of vinyl radicals to mercaptoalkyl radicals has a value of less than 0.2 have been shown to provide cured coatings that display premium release of aggressive acrylic adhesives, but said coatings do not possess the preferred adhesion to paper. When said ratio has a value of greater than 1.0 the cured compositions of this invention do not provide premium release of aggressive acrylic adhesives.

The compositions of this invention may also contain ingredients that are common to radiation-curable compositions such as photosensitizers and gelation inhibitors. An effective amount of said ingredients may be determined by simple experimentation.

A radiation-curable composition is more useful if it does not cure or gel at room temperature for a period of at least 8 hours, preferably for at least 24 hours, after being prepared. The compositions of this invention have been found to be free of gelation for more tha 48 hours at room temperature in the absence of radiation. However, in certain instances, it may be desired to assure that no gelation occurs over a period of weeks or months. To this end a gelation inhibitor may be admixed with the compositions of this invention at any time prior to curing or gelation of the composition. Any suitable gelation inhibitor may be used in the compositions of this invention, but the best inhibitors known to the inventors at this time are dihydric phenols and their alkylated derivatives. More particularly, the inhibitors are pyrocatechol or hydroquinone or monoethers thereof or alkyl-substituted hydroquinone or pyrocatechol or monoethers thereof. These materials are described in "Stabilization of Polymers and Stabilizer Processes," a publication of the American Chemical Society, 1969. These inhibitors are effective in concentrations as low as approximately 50 parts per million parts of (A) plus (B), on a weight basis.

To increase the rate of cure of the compositions of this invention under the action of ultraviolet light, and thus decrease the minimum cure time, it is desirable to use an effective amount of a photosensitizer. Any suitable photosensitizer may be used such as the well-known aromatic ketones such as acetophenone, benzophenone, dibenzosuberone and benzoin ethyl ether and azo compounds such as azobisisobutyronitrile. Any suitable photosensitizer may be admixed with the compositions of this invention at any time prior to the curing of said compositions. These photosensitizers are effective in concentrations as low as approximately 500 parts by weight for every one million parts by weight of (A) plus (B).

The compositions of this invention may contain other non-essential ingredients such as pigments and rheology control additives which will neither interfere significantly with the radiation cure of the composition nor produce non-premium release of aggressive acrylic adhesives from the cured composition.

The compositions of this invention are useful as radiation-curable release coatings, paint additives, coil coatings, textile treatments, water-repellant coatings, inks and the like.

The compositions of this invention may be applied and cured to any suitable solid substrate such as cellulosic materials such as paper and wood; metals such as aluminum, iron and steel; plastics such as polyethylene or polypropylene films or sheets, polyethylene or polypropylene films on other surfaces such as on paper, polyamides such as nylon and polyesters such as Mylar, (registered trademark of E. I. DuPont de Nemours, Wilmington, Del.); and siliceous materials such as ceramics, glass and concrete.

The compositions of this invention are particularly useful as release coatings for paper or plastic coated paper. Said compositions may be applied in a thin layer to the surface of paper to provide a coating with a mass of approximately one gram per square meter of coated paper. In the cured form these thin coatings will release aggressive acrylic adhesives with a force of no more than approximately 38.61 newtons/meter as measured by the method hereinafter described. It is to be understood that said coatings may also be applied in thinner or thicker layers as long as the radiation cure of the coating is not impaired. In the paper release coating art the amount of release coating will generally vary from approximately 0.1 to 2.0 grams per square meter.

In the method of this invention the compositions of this invention are applied to a substrate by any suitable method such as brushing, dipping, spraying, rolling and spreading. Application of said compositions to paper may be done by any of the suitable methods that are well-known in the paper coatings art such as by a trailing blade coater, by an air knife, by kiss rolls, by gravure rolls, by printing or by any other known method. The compositions of this invention may be applied to the entire surface of a substrate or to any portion thereof, as desired. After the compositions has been applied it is preferred to remove any solvents that may be present in the applied composition. Preferably the mixture of (A) and (B) has a viscosity such that no solvent is required to aid in the preparation of the composition or in the application of said composition to the substrate.

The applied composition of this invention is cured by exposing at least a portion thereof to energetic radiation for a length of time sufficient to cure the exposed composition and to adhere the exposed composition to the substrate. The cured state of the composition is determined by the Scotch (registered trademark of 3M Company, Minneapolis, Minn.) tape test hereinafter described. To be effective as a release coating on a solid substrate the applied, cured compositions of this invention must adhere to the substrate with an adhesive force that is greater than the adhesive force between the cured composition and the adhesive to be released. Preferably the applied, cured composition should pass the rub-off test, hereinafter described. It should be understood that the entire applied composition can be exposed to radiation and cured or only a portion thereof may be exposed and cured and anay uncured composition subsequently removed, as desired.

Energetic radiation, for the purposes of this inventin, is radiation selected from the group consisting of actinic radiation such as ultraviolet light, X-rays and gamma rays and particulate radiation such as alpha particles and electron beams. The length of time that the compositions of this invention should be exposed to the energetic radiation, in order to cure said composition and to adhere it to the substrate, will depend upon the energy of the radiation and the intensity of the radiation that is incident on the composition. Furthermore, the effectiveness of incident radiation is dependent upon several factors. For example, it is known that low energy electron beams are more effective in an inert atmosphere such as nitrogen, than in air. We have also found that the adhesion to paper and the minimum cure time for the compositions of this invention that are exposed to ultraviolet light are directly proportional to the oxygen content of the atmosphere between the composition to be cured and the ultraviolet light source. Of course, it is well known that the intensity of the incident radiation is also inversly proportional to the distance between the energy source and the composition. Whatever form of energetic radiation is used in the method of this invention, the compositions of this invention are exposed to it for a length of time sufficient to cure the composition and to adhere it to the substrate.

Ultraviolet light is a preferred form of energetic radiation for curing the compositions of this invention because of its relative safety, lower cost and lower power requirements. Ultraviolet light is also preferred because it provides cured coatings that have preferred levels of adhesion to paper. Furthermore, ultraviolet light that contains radiation having a wave length of from approximately 200 to 400 nanometers is highly preferred for the method of this invention because such radiation will cure a composition of this invention, that has been coated on paper, within 5 seconds, as detailed in the following examples.

The compositions of this invention and the method of this invention uniquely provide for the preparation of articles comprising a substrate having adhered to at least a portion of its surface a cured polydiorganosiloxane coating that will release aggressive acrylic adhesive with a force of no more than approximately 38.61 newtons per meter.

The best way to practice this invention is detailed in the following examples which are provided to further exemplify the invention and are not to be construed as limiting the invention which is properly delineated by the appended claims. All parts are parts by weight and all viscosities are at 25° C. All release data were measured in grams per inch and converted to N/m for this application by multiplying by 0.3860886 and rounding off.

EXAMPLE 1

A three-necked resin kettle fitted with a mechanical stirrer, reflux condenser and addition funnel was charged with 43.5 parts of $HO\{CH_3(HSCH_2CH_2CH_2)SiO\}_xH$ and 4 parts of hexamethyldisiloxane. The stirred mixture was heated to 70°–80° C., 0.25 parts of $CF_3SO_3H$ was added to the warm mixture and heating was continued at 70°–80° C. for an additional 30 minutes. Over a period of 1 hour, 456.5 parts of dimethylcyclopolysiloxane was added to the resin kettle and the reaction temperature was maintained at 80°–90° C. Water, 0.03 parts, was then added and the mixture was heated for 5.5 hours at about 80° C. The $CF_3SO_3H$ was neutralized with 2.5 parts of $Na_2CO_3$ and stirring was continued at 80° C. for an additional 1 hour. The mixture was filtered and stripped at 150° C. and less than 5 mm. of mercury pressure (667 pascal). The nonvolatile fluid had a viscosity of 1.62 pascal-seconds and consisted of 0.78 mole percent $(CH_3)_3SiO_{1/2}$ units, 94.26 mole percent $(CH_3)_2SiO$ units and 4.96 mole percent $CH_3(HSCH_2CH_2CH_2)SiO$ units. Thus, the silicon-bonded organic radicals of the non-volatile fluid consisted of 2.47 percent $HSCH_2CH_2CH_2-$ radicals and 97.53 percent $CH_3-$ radicals.

EXAMPLE 2

Several silicone polymers consisting of 5 mole percent of $CH_3(HSCH_2CH_2CH_2)SiO$ units and 95 mole percent of $(CH_3)_2SiO$ units and being endblocked with $(CH_3)_3SiO_{1/2}$ units were prepared which had various viscosities. Approximately 2.5 percent of al organic radicals in the polymers were mercaptopropyl. Ninety-seven parts of each polymer was mixed with 1.5 parts of benzophenone at 55° C. The resulting mixtures were then cooled and mixed with 3 parts of $\{CH_3(CH_2=CH)SiO\}_z$ where z had a value of from 4 to 8 inclusive, thereby providing approximately 0.56 vinyl radicals for every mercaptopropyl radical, to produce radiation-curable formulations.

The stability of each curable formulation was determined to be greater than 2 days by noting the length of time at room temperature that elapsed after mixing until the formulation gelled.

Each formulation was coated onto 40 pound supercalendared Kraft paper using a blade coater to give approximately 0.7 pounds of coating per 3,000 square feet of paper surface (1.1 g/m²). The coating was exposed at a distance of approximately 80 mm for 1.6 seconds to two 20 inch (0.51 m) Hanovia medium pressure lamps having an input of 200 watts/inch (7.8 kW/m), an output of 1.4 kW/m in the ultraviolet and a U.V. maximum at 366 nm. The coating was considered to be cured if a piece of Scotch tape would stick to itself after having first been adhered to the coating and then removed and doubled back on itself. All coatings passed this cure test.

The adhesion of each cured formulation to the paper was determined by rubbing the cured coating with the index finger. Adhesion was deemed preferred if no rub-off occurred. All coatings passed this test for preferred adhesion.

Each cured formulation was prepared for release testing according to the following procedure. After being aged overnight at room temperature the cured coating was coated with adhesive using a solution of Monsanto GMS-263 acrylic adhesive. In certain cases the cured coating was coated with adhesive immediately after being cured. The acrylic adhesive solution was applied to the cured coating at a wet thickness of 3 mils (76.2 μm) using a Bird Bar. The applied adhesive was air-dried at room temperature for 1 minute, heated at 65° C. for 1 minute and then cooled to room temperature again for 1 minute. A sheet of 60 pound Matte Litho was applied to the dried adhesive and the resulting laminate was pressed through two rolls of an off-set printer and aged for 20 hours at 70° C.

Release testing of the laminates was accomplished by cooling the aged laminates to room temperature, cutting the cooled laminates into 1 inch (25.4 mm) strips and pulling the Matte/adhesive lamina from the Kraft paper/coating lamina at an angle of 180° ($\pi$ radians) at 400 inches/minutes (0.17 m/s). The force, in grams per inch, that was required to separate the laminae was noted. A composition that results in a release value of no more than 38.61 N/m using this test is considered to display premium release.

Table I summarizes the release values (converted from grams/inch to newtons/meter) that were obtained for the several cured formulations. Note that formulations 1 to 6 (except formulation 4 when laminated immediately) produced a coating that released the aggressive acrylic adhesive (GMS-263) with a force of no more than 38.61 N/m and are therefore regarded as premium release coatings.

For comparison, formulations 7 and 8 of Table I were prepared, consisting of the same mercaptopropyl-containing silicone polymer but having viscosities of 6.45 and 1.62 Pa·s, respectively and containing the same concentration of benzophenone. These polymers were mixed with trimethylsiloxane-endblocked polydiorganosiloxanes consisting of 5 mole percent of $CH_3(CH_2=CH)SiO$ units and 95 mole percent of $(CH_3)_2SiO$ units and having viscosities of 5.7 and 1.7 Pa·s, respectively so that there was approximately 0.5 vinyl radicals for every mercaptopropyl radical in the mixtures. These mixtures were stabilized with 250 parts of p-mehoxyphenol per one million parts of the mixture and the stabilized mixtures were coated onto 40 pound Kraft paper using a Model 1250 Multilith off-set printer to give 1.1 g/m² of coating on the paper. The coated paper was processed as above and tested. The coatings were found to be cured, and adhesion to the Kraft paper was satisfactory but rub-off was noted. Furthermore, the cured coatings released aggressive acrylic adhesives with a force of 59.07 and 43.63 N/m, respectively. Immediate lamination of formulations 7 and 8 was not done.

TABLE I

| Formulation Number | Polymer Viscosity (Pa s) | Aggressive Acrylic Adhesive Release (N/m) | |
| --- | --- | --- | --- |
| | | Delayed Lamination | Immediate Lamination |
| 1 | 7.20 | 21.23 | 21.23 |
| 2 | 3.65 | 25.10 | 25.10 |
| 3 | 2.00 | 17.37 | 27.03 |
| 4 | 1.42 | 23.17 | 40.54 |
| 5 | 1.23 | 27.03 | — |
| 6 | 0.78 | 23.17 | 32.82 |
| 7(1) | 6.45 | 59.07 | — |
| 8(1) | 1.62 | 43.63 | — |

(1)For comparison purposes only. The source of silicon-bonded vinyl radicals was a $(CH_3)_3SiO_{\frac{1}{2}}/(CH_3)_2SiO/CH_3(CH_2=CH)SiO$ copolymer.

EXAMPLE 3

Radiation-curable formulations similar to the radiation-curable formulations of this invention that are described in Example 2 were prepared except that the trimethylsiloxane-endblocked silicone polymer consisted of 3 mole percent of $CH_3(HSCH_2CH_2CH_2)SiO$ units and 97 mole percent of $(CH_3)_2SiO$ units. One formulation wherein the silicone polymer had a viscosity of 1.40 Pa·s cured to a no-rub-off coating on Kraft paper that released aggressive acrylic adhesive with a force of 38.61 N/m when laminated after 1 day and 32.82 N/m when laminated immediately. Another formulation wherein the silicone polymer had a viscosity of 0.80 Ps·s cured to a no-rub-off coating on Kraft paper that released aggressive acrylic adhesive with a force of 25.10 N/m when laminated after 1 day of aging and 30.89 N/m when laminated immediately.

Silicone polymers having viscosities of 1.50 and 0.90 Pa·s and having 0.97 percent $HSCH_2CH_2CH_2$-radicals and 99.03 percent $CH_3$- radicals were used to prepare radiation-curable polydiorganosiloxane compositions. When the compositions were prepared, cured and tested according to the method of Example 2, the coatings did not pass the cure test, although they did release aggressive acrylic adhesive with a force of 27.03 and 21.23 N/m, respectively, when laminated after 1 day of aging.

EXAMPLE 4

Formulations 1, 2, 3, and 4 of Example 2, Table I were applied to polyethylene-coated Kraft paper using a blade coater to apply approximately 0.2 grams of coating per square meter of paper surface. The applied coatings were cured, aged for 1 day, laminated with GMS-263 aggressive acrylic adhesive and tested as in Example 2. All coatings cured satisfactorily and had good adhesion to the polyethylenecoated paper. Release forces for the formulations varied from 28.96 to 34.75 N/m.

Formulations 1, 2, 3, and 4 of Example 2, Table I were also applied to Hudson Clay-coated Kraft paper at levels of approximately 0.6 g/m². Release values for formulations 1, 2, and 3 were 38.61, 42.47, and 57.91 N/m, respectively. Formulation 4 would not release the Matte/adhesive lamina before the lamina tore.

EXAMPLE 5

Formulation 4 of Example 2, Table I was applied to 40 pound supercalendared Kraft paper using a Model 250 Multilith off-set printer to give a coverage of approximately 1.1 g/m². The coating was cured, laminated immediately with GMS-263 aggressive acrylic adhesive and tested as in Example 2. A release value of 30.89 N/m was observed.

EXAMPLE 6

Formulation 4 of Example 2, Table I was applied to 40 pound supercalendared Kraft paper using a blade coater to give a coverage of approximately 1.1 g/m². The coating was cured with two Hanovia lamps in three different atmospheres, i.e. in air, in nitrogen and with a combination of one U.V. lamp in air and one U.V. lamp in nitrogen. The minimum amount of time that was required to cure the coating was noted and the release force required to release GMS-263 aggressive acrylic adhesive, that was applied after aging of the release coating for 1 day, was measured. A nitrogen-only atmosphere permitted rapid cure but resulted in coatings that could be rubbed off. An air-only atmosphere required the longest minimum cure time but provided coatings that did not rub off. The combination air-nitrogen atmospheres allowed an intermediate cure time and gave coatings that did not rub off. Table II presents these data and the release forces that were measured.

TABLE II

| Curing Atmosphere | Minimum Cure Time (seconds) | Adhesive Release (N/m) |
| --- | --- | --- |
| Two lamps in $N_2$ | 0.27(1) | 30.89 |
| Two lamps in $N_2$ | 0.53(1,2) | 19.30 |
| Two lamps in air | 0.72 | 32.82 |
| One lamp in $N_2$ and One lamp in air | 0.40 | 19.30 |

(1)Coating passed the cure test but failed the adhesion test.
(2)Double minimum cure time.

EXAMPLE 7

The testing of formulation 4 of Table I was repeated as in Example 2 except that the amount of $\{CH_3(CH_2=CH)SiO\}_z$ was varied from approximately 1.8 to 18 parts per 100 parts of the mixture. The ratio of the number of vinyl radicals to number of mercaptopropyl radicals in the formulation varied from 0.4 to 4. The formulations wherein the ratio of vinyl radicals to mercaptopropyl radicals was approximately 1 or less gave cured coatings that displayed premium release of aggressive acrylic adhesive. Formulations wherein said ratio was 2 or 4 gave higher release values. Table III summarizes the release values that were obtained with Monsanto's® GMS-263 acrylic adhesive and with a nonacrylic adhesive, National Starch's® 36-6045 SBR adhesive.

TABLE III

| Vinyl/Mercaptopropyl (moles) | Adhesive Release (N/m) | |
| --- | --- | --- |
| | Acrylic | SBR |
| 0.4 | 28.96 | 32.82 |
| 0.6 | 31.66 | 34.75 |
| 1.0 | 34.75 | 42.47 |
| 2.0 | 46.33 | 48.26 |
| 4.0 | 54.05 | 65.64 |

EXAMPLE 8

A trimethylsiloxane-endblocked polydiorganosiloxane having 5 mole percent $CH_3(HSCH_2CH_2CH_2)SiO$ units and 95 mole percent $(CH_3)_2SiO$ units and having a viscosity of approximately 1.50 Pa s was mixed with $\{CH_3(CH_2=CH)SiO\}_{4-8}$ so that there was approximately 0.5 vinyl radicals for every mercaptopropyl radical. The mixture was applied to paper at a coating weight of 1.1 g/m² and cured with 0.25 megarads of 2 MV electron radiation. The cured coating was aged, laminated and tested as in Example 2. A release value of 15.44 N/m was observed for GMS-263 adhesive.

EXAMPLE 9

Ninety-seven parts of the polydiorganosiloxane of Example 8 having 5 mole percent $CH_3(HSCH_2CH_2CH_2)SiO$ units was mixed with 1.5 parts of benzophenone and 3.0 parts of a hydroxyl-endblocked poly(methylvinylsiloxane) having approximately 10 silicon atoms. The resulting radiation-curable mixture contained approximately 0.5 vinyl radicals for every mercaptopropyl group. The mixture was coated onto Kraft paper and was cured to a no-smear, no-migration, no-rub-off coating as in Example 2. The cured coating was aged overnight at room temperature, laminated with GMS-263 adhesive and aged at 70° C. for 20 hours, as in Example 2. Release testing gave a release value of 28.96 N/m.

That which is claimed is:

1. A radiation-curable polydiorganosiloxane composition consisting essentially of a mixture of
   A. a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein $n$ has a value of from 1 to 4 inclusive, any remaining organic radicals in (A) being alkyl radicals having from 2 to 6, inclusive, carbon atoms or phenyl, and
   B. a methylvinylpolysiloxane, compatible with (A) and having an average of at least three vinyl groups per molecule, the amount of (B) being sufficient to provide from 0.2 to 1.0 silicon-bonded vinyl radicals for every silicon-bonded mercaptoalkyl radical in the composition.

2. The composition of claim 1 wherein $n$ has a value of 3 and the methylvinylpolysiloxane has the formula $\{CH_3(CH_2=CH)SiO\}_z$ wherein $z$ has a value of from 3 to 10 inclusive.

3. The composition of claim 2 wherein the triorganosiloxane-endblocked polydiorganosiloxane consists essentially $(CH_3)_3SiO_{1/2}$ siloxane units, $(CH_3)_2SiO$ siloxane units and $CH_3(HSCH_2CH_2CH_2)$ SiO siloxane units.

4. The composition of claim 3 further containing an effective amount of a photosensitizing compund.

5. A method of treating a solid substrate to improve the release of adhesive materials therefrom, said method comprising
   I. applying to the solid substrate a composition obtained by mixing components consisting essentially of
      A. a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein $n$ has a value of from 1 to 4 inclusive, any remaining organic radicals in (A) being alkyl radicals having from 2 to 6, inclusive, carbon atoms and phenyl, and
      B. a methylvinylpolysiloxane, compatible with (A) and having an average of at least three vinyl groups per molecule, the amount of (B) being sufficient to provide from 0.2 to 1.0 silicon-bonded vinyl radicals for every silicon-bonded mercaptoalkyl radical in the composition, II. exposing the applied composition to energetic radiation, and III. recovering an article comprising the solid substrate having adhered thereto a cured polydiorganosiloxane that will provide premium release of aggressive acrylic adhesives therefrom.

6. The method of claim 5 wherein the composition further consists of an effective amount of a photosensitizing compound and the applied composition is exposed to radiation having a wavelength of from 200 to 400 nanometers.

7. The method of claim 6 wherein the triorganosiloxane-endblocked polydiorganosiloxane consists essentially of $(CH_3)_3SiO_{1/2}$ siloxane units, $(CH_3)_2SiO$ siloxane units and $CH_3(HSCH_2CH_2CH_2)SiO$ siloxane units and the methylvinylpolysiloxane has the formula $\{CH_3(CH_2=Ch)SiO\}_z$, wherein z has a value of from 3 to 10 inclusive.

8. The article produced by the method of claim 7.

9. The method of claim 7 wherein the solid substrate is paper.

10. The article obtained by the method of claim 9.

11. The method of claim 7 wherein the solid substrate is plastic.

12. The article produced by the method of claim 11.

13. The article produced by the method of claim 5.

14. The method of claim 5 wherein the solid substrate is paper.

15. The article obtained by the method of claim 14.

16. The method of claim 5 wherein the solid substrate is plastic.

17. The article produced by the method of claim 16.

18. An article comprising a solid substrate having adhered to at least a portion thereof the cured composition of claim 3.

19. The article of claim 18 wherein the solid substrate is paper.

20. The article of claim 18 wherein the solid substrate is plastic.

21. An article comprising a solid substrate having adhered to at least a portion thereof the cured composition of claim 1.

22. The article of claim 21 wherein the solid substrate is paper.

23. The article of claim 21 wherein the solid substrate is plastic.

* * * * *